Aug. 18, 1953     G. L. KLUTER     2,648,873
FALLER BAR
Filed Nov. 12, 1948
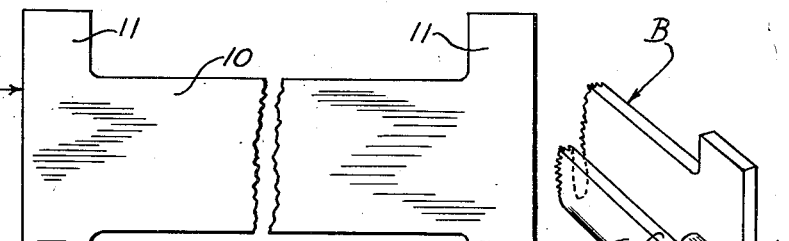
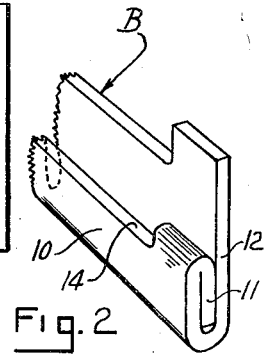
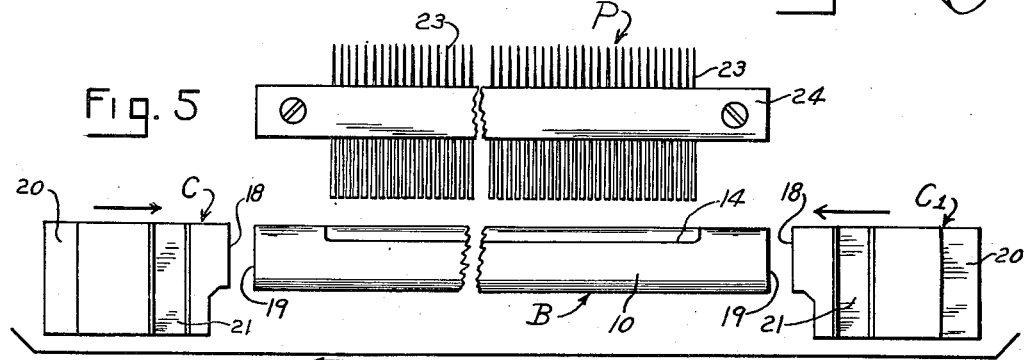
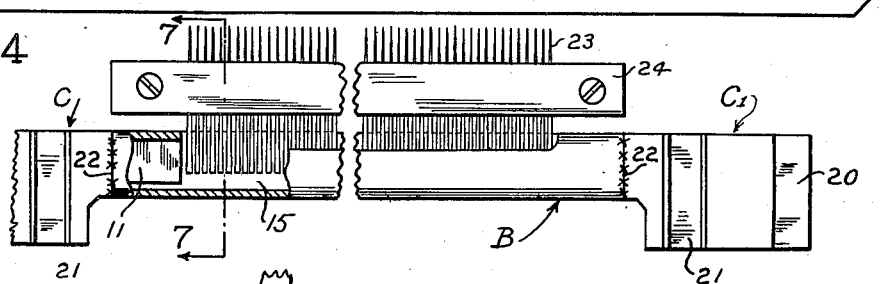
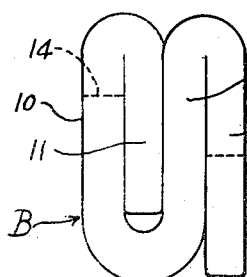
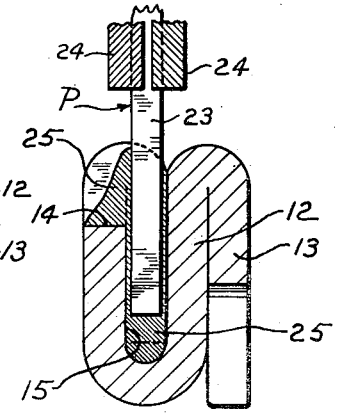
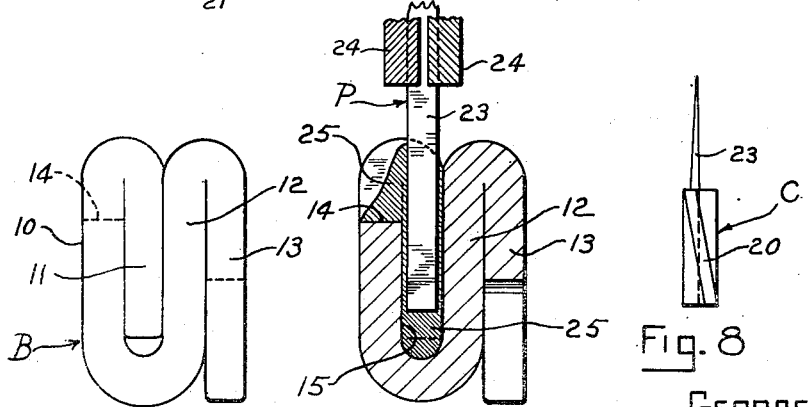
INVENTOR.
GEORGE L. KLUTER
BY
Richey & Watts
ATTORNEYS Patented Aug. 18, 1953

2,648,873

UNITED STATES PATENT OFFICE 2,648,873

FALLER BAR

George L. Kluter, Shaker Heights, Ohio, assignor to The Warner & Swasey Company, Cleveland, Ohio, a corporation of Ohio Application November 12, 1948, Serial No. 59,541

5 Claims. (Cl. 19—129)

This invention relates to faller bars and a method of making the same, the bars being employed in drafting machines or gill boxes wherein fibers or slivers of material are drafted preparatory to making yarn. A typical machine adapted to employ faller bars made in accordance with the invention is described in the application of James R. Longstreet and Raynaldo Jacques, Serial No. 41,646, filed July 30, 1948.

Primary objects of the invention are to provide a firm soldered mounting for the pins which resists the shocks and impacts to which they are subjected in service, the mounting facilitating application of the solder to the bars and pins; to provide a mounting that does not require deformation of the body to retain the pins, so that the pins may be readily replaced; to provide a method of manufacture wherein the faller bars are cheaper to manufacture when made in accordance with the invention than prior devices having the aforesaid advantages; and to provide a finished article that is fully as rugged and long-wearing as prior devices that cost considerably more to manufacture.

In a preferred form of this invention, the aforesaid objects and advantages are accomplished by manufacturing a composite faller bar in accordance with a novel method of manufacture. Briefly, the portion of the bar that forms the back body for the comb of pins is bent from a sheet metal blank of substantially the same thickness as the pins, the blank having lateral tongues or tabs at each end thereof. These tongues are folded over to form the ends of a groove for the pins, and the blank is folded upon itself against the tongues to complete the groove of the proper dimension to receive the pins. The blank is folded so that one wall of the groove is narrower than the other wall thereof, which greatly facilitates application of the solder to the pins, and which provides a slug of solder that increases the strength of the joints with the pins.

With this construction the groove does not carry to the ends of the body so that the latter presents a virtually solid, flat surface that is welded to a pair of end pieces, preferably made of tool steel. Of course, the pins are soldered in place in the bar after the end pieces are welded to the sheet metal body. The end pieces are received by the lead screws and saddles that guide and traverse the faller bars around the drafting machines. In this manner, a great deal of machining is eliminated, and a considerable saving in the quantity of tool steel is made possible, compared with the material cost of prior devices, formed from one piece of tool steel. Nevertheless, the composite faller bar is as rugged and long-wearing as one made from a solid piece of steel. An additional saving is had in the labor cost of forming the groove in the bar for receiving the pins. The bending of the sheet metal blank to form the groove is a much cheaper operation than the preparation or drilling of a solid blank for the same purpose.

The manner in which these and other objects are accomplished will be apparent from the following detailed description of a preferred form of the invention.

In the drawings:

Fig. 1 shows the sheet metal blank for the body or comb back;

Fig. 2 is a fragmentary perspective view of the blank after two or three bending operations required to form the body have been completed;

Fig. 3 is an end view of the sheet metal body after bending has been completed;

Fig. 4 shows the completed sheet metal body and the two end pieces that cooperate with the lead screws and saddles before they are welded in place;

Fig. 5 shows a comb of pins mounted in a jig before insertion in the faller bar;

Fig. 6 shows the faller bar after welding and the pins inserted therein before a soldering operation;

Fig. 7 is a fragmentary section taken on 7—7 of Fig. 6 after the solder has been applied; and, Fig. 8 is an end view of the completed faller bar.

Referring to the drawings, the blank shown in Fig. 1 has a longitudinal or body section 10 flanked by laterally extending tabs or tongues 11, it being preferable that the entire blank be of substantially the same thickness as the pins to be mounted therein, although the critical thickness is that of the tabs or tongues 11.

As seen in Fig. 2, the tabs 11 are first bent against the body 10 of the blank, and the remainder 12 of the blank body is folded around and against the tabs. Then, as seen in Fig. 3, the projecting portion of the balance of the blank body is doubled upon itself, that is against the portion 12, to bring the body to the proper width and additionally reinforce it by means of the flange 13, produced by the final bending operation.

It is noted that the tabs are of such a length and they are bent in such a manner that a longitudinal notch 14 appears in the finished blank. Because of this structure the associated wall of the groove 15 formed by parallel stretches of the body is narrower than the reinforced wall of the groove, which facilitates the soldering operation, as will be described presently.

Referring to Fig. 4, the two end pieces or plates C and C₁ are shown before the welding operation that joins them to sheet metal body or comb back member B is performed. Members C and C₁ are alike except that one is a right-hand and the other a left-hand member. They are formed with short, flat-faced projections 18 arranged to be welded to the flat ends 19 of the body B. In accordance with the conventional practice, the end pieces have diagonal tongues 20 for engagement with the lead screws, and grooves 21 that assist in guiding the bars during their vertical motion in the drafting mechanism. As seen in Fig. 6, faces 18 and 19 are brought together and firmly welded as at 22 to provide a unitary member having long-wearing end pieces with a cheaply and readily manufactured comb back.

The comb of pins P is made up of a series of pins 23, and these are arranged in a jig which comprises a pair of slotted clamp members 24 which hold the pins in a proper position preparatory to the soldering operation that joins them to the composite faller bar. The bases of the assembled pins are inserted in the groove 15 in the member B and solder 25 is flowed into the interstices between the pins and the body B; the relieved section 14 of the outer wall greatly facilitating application of solder to the assembly and also providing a strip of solder that strengthens the soldered joint. The pins are so effectively soldered when made in accordance with the invention that the body need not be deformed to grip the pins, which greatly facilitates replacement of the pins due to wear or breakage thereof. By forming the sheet metal blank of substantially the same thickness as that of the pins, the tabs 11 automatically space the parts to provide the groove for the pins.

The advantages of long-wear obtained by making the end pieces C of carbon or alloy steel are obtained without need for machining the entire part from a solid piece of said material. An additional advantage is that all the members C and C₁ may be alike, whereas member B may be bent from blanks of various thicknesses to accommodate different sizes of pins which reduce the inventory of parts necessary to produce a variety of faller bars.

With regard to the nature of the welding and soldering operations, the invention is not limited to any particular type of welding or soldering operation. The only requirement is that the melting point of the material employed to retain the pins in the member B should be considerably less than that of the material employed to weld the end pieces to the body, so that the pins may be replaced without weakening or softening the welded joints. Accordingly, the terms welding and soldering as used in the claims are intended to refer to bonding materials having these relative characteristics.

Having completed a detailed description of a preferred form of the invention, it will be understood that various variations and modifications from the described method article may be made without departing from the essence of the invention and the advantages thereof. Accordingly, it is contemplated that the claims and not the aforesaid preferred embodiment be determinative of the scope of the invention.

What is claimed is:

1. A faller bar for a drafting machine comprising a comb back bent up of sheet metal to form a comb-receiving groove with integral bent tabs closing the ends of the groove, guide members welded to the ends of said comb back, and a comb of drafting pins soldered in the groove of said back, one longitudinal wall of said groove being narrower than the other to facilitate application of solder to the base of said comb.

2. A faller bar for a drafting machine comprising a comb back bent up of sheet metal to form a comb receiving groove with integral bent tabs closing the ends of the groove, one wall of said groove being of double thickness, guide members welded to the ends of said comb back, and a comb of drafting pins soldered in the groove of said back, one longitudinal wall of said groove being narrower than the other to facilitate application of solder to the base of said comb of pins.

3. A faller bar for a drafting machine comprising a comb back bent up of sheet metal to form a comb receiving groove with integral bent tabs closing the ends of the groove, one wall of said groove being of double thickness, alloy steel guide members welded to the ends of said comb back, and a comb of drafting pins soldered in the groove of said back, one longitudinal wall of said groove being narrower than the other to facilitate application of solder to the base of said comb of pins.

4. A faller bar for a drafting machine comprising a longitudinal comb back bent up of a body of sheet metal to form a comb-receiving groove with integral bent tabs depending from said sheet metal body and closing the ends of the groove, guide members welded to the ends of said comb back, and a comb of drafting pins soldered in the groove of said back, said tabs being of substantially the same thickness as the pins and being bent longitudinally, the sheet metal body from which said tabs depend being wider at the tabs than between the tabs.

5. The method of making a faller bar for drafting machines of the type having a comb back and a row of pins mounted therein, comprising the steps of forming an elongated sheet metal blank having a body with laterally projecting tongues at each end of one side thereof with the thickness of the tongues being equal to the width of the pins, folding over the tongues against the blank body, folding the blank body around said tongues to form a longitudinal groove closed at each end by said tongues with the ends of said bent member at the groove being substantially solid, folding the balance of the blank body upon itself to reinforce the associated wall of said groove, welding a guide member to each end of said body and tongues, and thereafter inserting a comb of pins in said groove and bonding them to the walls of the groove.

GEORGE L. KLUTER.

References Cited in the file of this patent

UNITED STATES PATENTS

| Number | Name | Date |
| --- | --- | --- |
| 214,194 | Reinhardt | Apr. 8, 1879 |
| 399,032 | Guild | Mar. 5, 1889 |
| 1,381,070 | Ferr | June 7, 1921 |
| 1,654,105 | Uzmann | Dec. 27, 1927 |
| 1,727,184 | Thompson | Sept. 3, 1929 |
| 2,233,719 | Vanderveld | Mar. 4, 1941 |

FOREIGN PATENTS

| Number | Country | Date |
| --- | --- | --- |
| 21,510 | Great Britain | of 1909 |